United States Patent
Suda

Patent Number: 5,258,804
Date of Patent: Nov. 2, 1993

[54] FOCUS DETECTION DEVICE HAVING A MECHANISM FOR ADJUSTING LIGHT-RECEIVING STATE

[75] Inventor: Yasuo Suda, Yokohama, Japan

[73] Assignee: Canon Kabushiki Kaisha, Tokyo, Japan

[21] Appl. No.: 653,235

[22] Filed: Feb. 11, 1991

[30] Foreign Application Priority Data

Mar. 13, 1990 [JP] Japan ................... 2-031726

[51] Int. Cl.⁵ ............................. G03B 13/36
[52] U.S. Cl. ................... 354/406; 354/402; 354/408
[58] Field of Search ............ 354/402, 406, 407, 408

[56] References Cited

U.S. PATENT DOCUMENTS

| | | | |
|---|---|---|---|
| 4,728,785 | 3/1988 | Ohnuki et al. | 354/408 |
| 4,774,539 | 9/1988 | Suda et al. | 354/408 |
| 4,777,506 | 10/1988 | Hiramatsu et al. | 354/408 |
| 4,792,669 | 12/1988 | Ohnuki et al. | 354/406 |
| 4,808,808 | 2/1989 | Karasaki et al. | 354/408 |
| 4,901,102 | 2/1990 | Karasaki et al. | 354/408 |
| 4,959,677 | 9/1990 | Suda et al. | 354/402 |
| 4,992,819 | 2/1991 | Ohtaka et al. | 354/408 |

FOREIGN PATENT DOCUMENTS

63-278012 11/1988 Japan.
1-120519 5/1989 Japan.

Primary Examiner—Russell E. Adams
Attorney, Agent, or Firm—Fitzpatrick, Cella, Harper & Scinto

[57] ABSTRACT

A device for adjusting the focus adjusting state of an objective lens includes a lens assembly having a field lens located in the vicinity of a predetermined imaging plane of the objective lens, and a pair of secondary imaging lenses. A line connecting the optical axes of the pair of secondary imaging lenses is located off the optical axis of the objective lens. A main body is provided for supporting the lens assembly and a light receiving sensor device is provided for receiving light distributions passing through the pair of secondary imaging lenses. A holding structure is provided for movably supporting the light receiving sensor device on the main body. Such structure allows accurate focusing of objects both on and off the optical axis of the objective lens.

3 Claims, 6 Drawing Sheets

FOCUS DETECTION DEVICE HAVING A MECHANISM FOR ADJUSTING LIGHT-RECEIVING STATE

BACKGROUND OF THE INVENTION

Field of the Invention

This invention relates to a focus detection device which can detect states of image formation of an objective lens, and specifically to a device that enables distance-measuring to be performed for objective lens areas off the optical axis.

Related Background Art

A focus detection device according to the same assignee as set forth in the U.S. Pat. No. 4,902,810 Japanese Laid-Open Patent Application Nos. 1-120519 and 63-278012, is known as a device that can detect focus detection states of an objective lens in relation to specific objects both on and off the optical axis.

With such a focus detection device featuring a capability of multiple-point distance-measuring, it is conceivable for cost reduction that light flux coming from the distance-measuring areas off the optical axis is deflected toward the optical axis using a field lens, thereby reducing a chip surface area of a light receiving means such as CCD. In the case where the light receiving means inclines off its predetermined position, the light flux enters the light accepting means on a skew, which is called a squint phenomenon. Thus, the detection accuracy deteriorates to a considerable degree. Regarding the focus detection device that detects focus adjusting states for objects only on the optical axis, adjusting details of its mechanism are described in the U.S. Pat. Nos. 4,792,669 and 4,777,506.

SUMMARY OF THE INVENTION

A main aspect of this invention is to reduce the size of photo-sensor devices, while maintaining a focusing function for objects both on and off the optical axis.

Another aspect of this invention is to provide a device that allows its constitution to be adjustable to achieve accurate-detection for the objects off the optical axis.

The third aspect of the present invention is to provide a device wherein the device comprises a light receiving means having a photo-sensor array, a pair of re-imaging optical systems located at the imaging side of the objective lens and dividing the projection pupil of the objective lens into two areas through which the light flux pass to form a secondary image of the object onto the photo-sensor array, and means for making the incident angle of the light flux to the photo-sensor array oblique to the predetermined light receiving surface in a plane perpendicular to the direction of the light receiving elements of the photo-sensor array. The focus adjusting state of the objective lens is detected on the basis of the relative positional relationship of the secondary object images and the light receiving means is tiltable to incline toward the direction of the photo-sensor array and to be fixed.

Other aspects of this invention will be mentioned in the embodiment to be described hereinbelow.

DETAILED DESCRIPTION OF THE PREFERRED EMBODIMENTS

Before elaborating on the embodiment of this invention, a general description will be given of a known camera, wherein this invention can be applied effectively.

Figure 8:
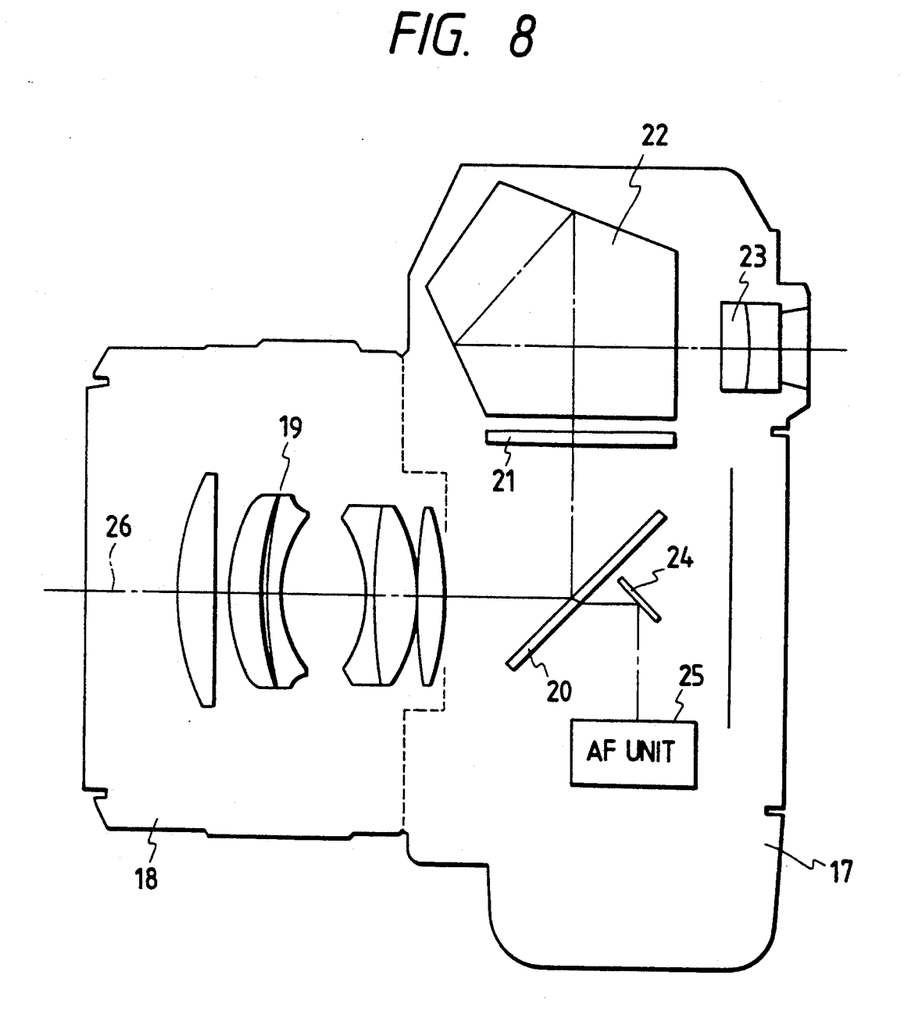
FIG. 8 is a cross sectional view illustrating a single-lens reflex camera having a focus detection device.

FIG. 8 is a cross sectional view illustrating a single-lens reflex camera having a focus detection device. Of the parts indicated by numbers, 25 is the focus detection unit. 17 is the camera body. 18 is the lens barrel that holds an objective lens 19 movable along the direction of an optical axis 26. 20 is the main mirror, which works along with the sub-mirror 24 to divide the object light (which passed through the objective lens 19) to both the finder and the said focus detection unit 25. 21 is the focusing screen, 22 is the penta prism, and 23 is an eyepiece lens, all of which constitute the finder system.

The embodiment of this invention is hereinbelow explained in detail, while pinpointing specific problems that will arise in the course of the embodiments of this invention.

Figure 1:
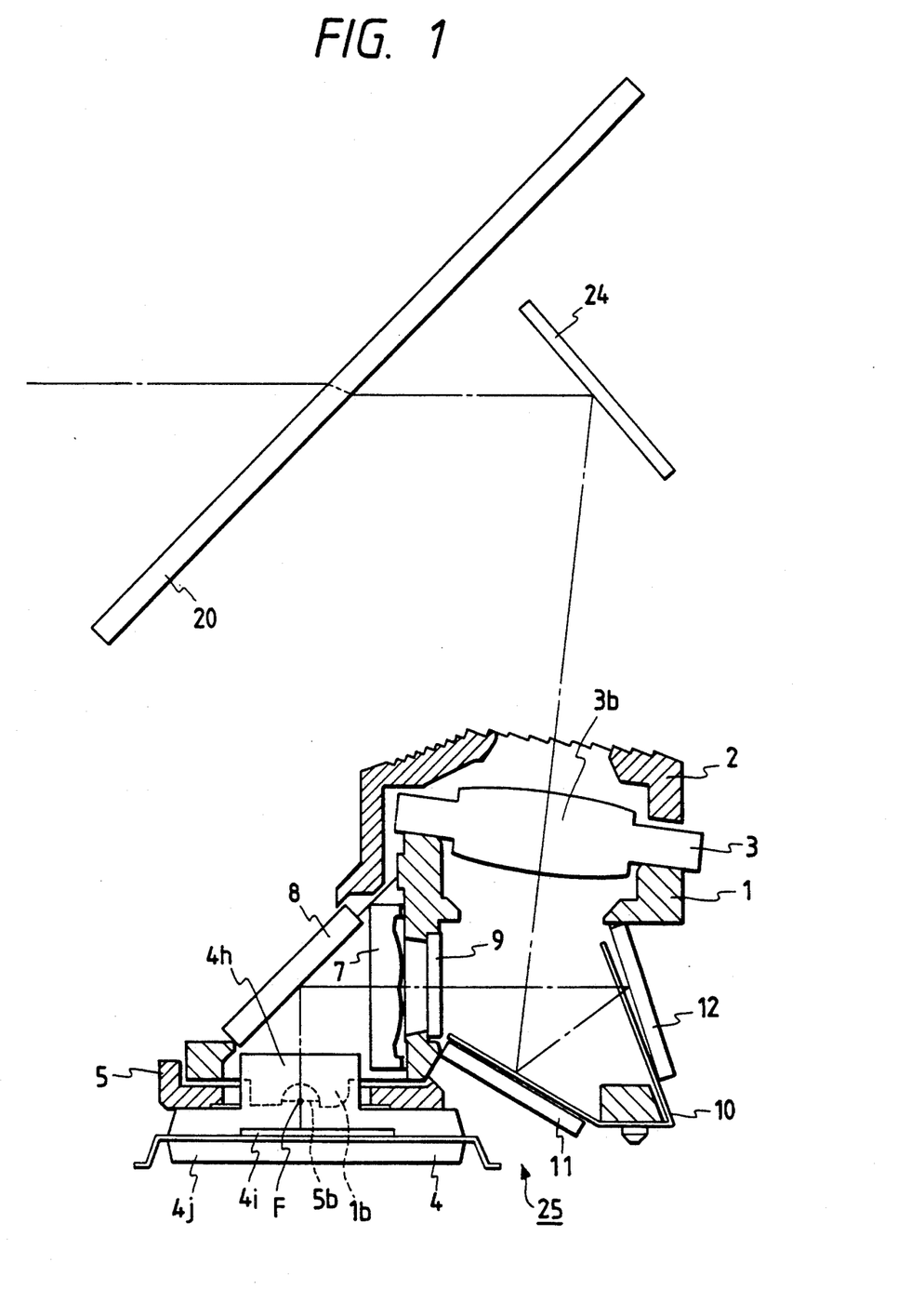
FIG. 1 is a cross sectional view illustrating a focus detection unit of this invention.
Figure 2:
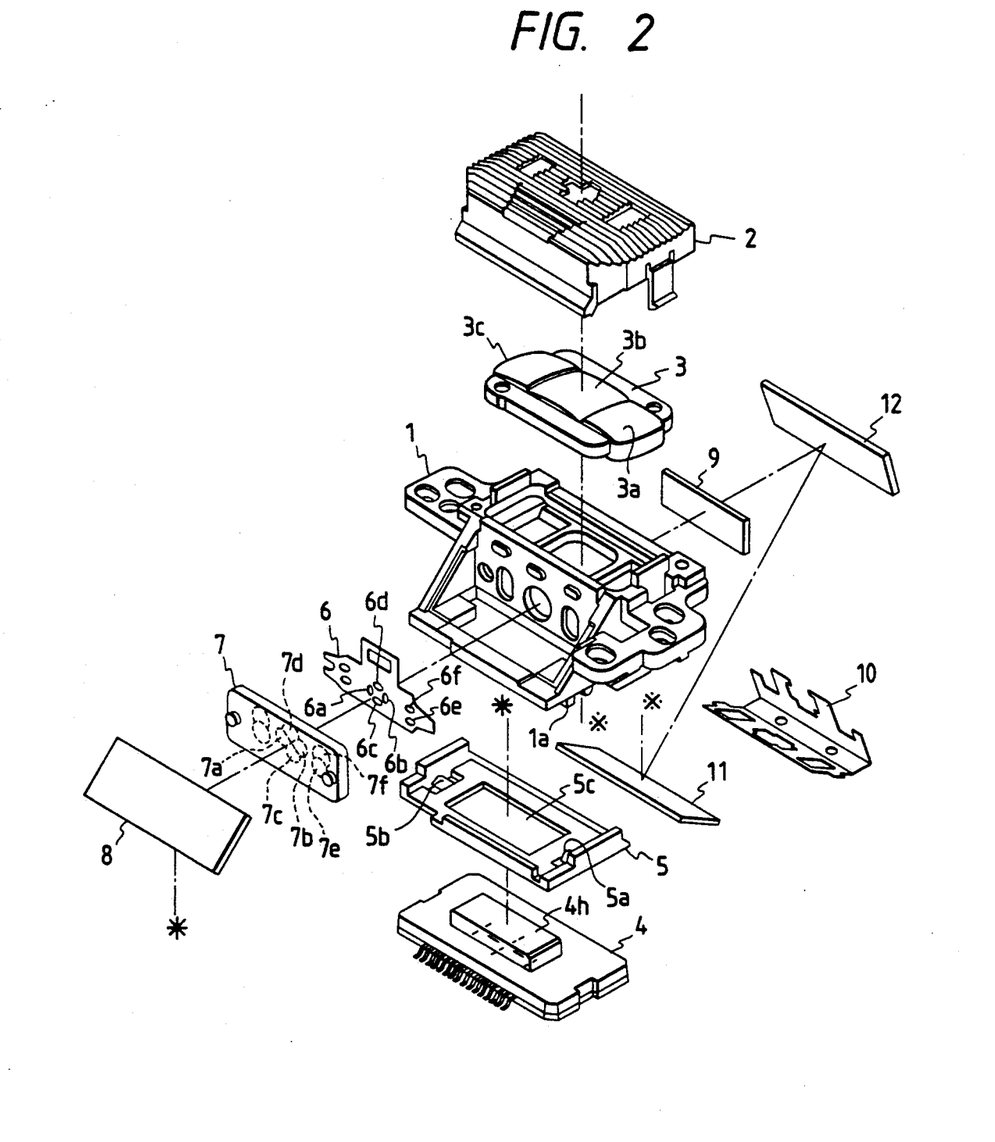
FIG. 2 is a perspective view illustrating a focus detection unit.

FIGS. 1 and 2 are drawings showing in detail the focus detection unit 25 with reference to its location indicated in FIG. 8. FIG. 1 is a cross sectional view and FIG. 2 is a perspective view showing all the integral parts. 1 is the main-body block. The field mask 2 and the split-image field lens 3 are mounted on the top of and close to the predetermined imaging plane the main-body block. At the bottom of the main-body block, photo-sensor devices 4 and the sensor holder 5 are mounted. Further assembled to the main body, as seen from the left of FIG. 1, are the multi-opening aperture 6, imaging lens 7, and the third mirror 8. From the right of FIG. 1, an infrared-ray cutting filter 9 is mounted. At the lower right of the main-body block, the shield plate 10 is inserted between the block and the first and the second mirrors 11, 12. The light flux coming in through the field mask 2 is reflected sequentially by the first mirror 11, the second mirror 12 and the third mirror 8, and is guided onto the sensor chip 4i of the photo-sensor device 4, thus forming the loop light path.

Figure 3:
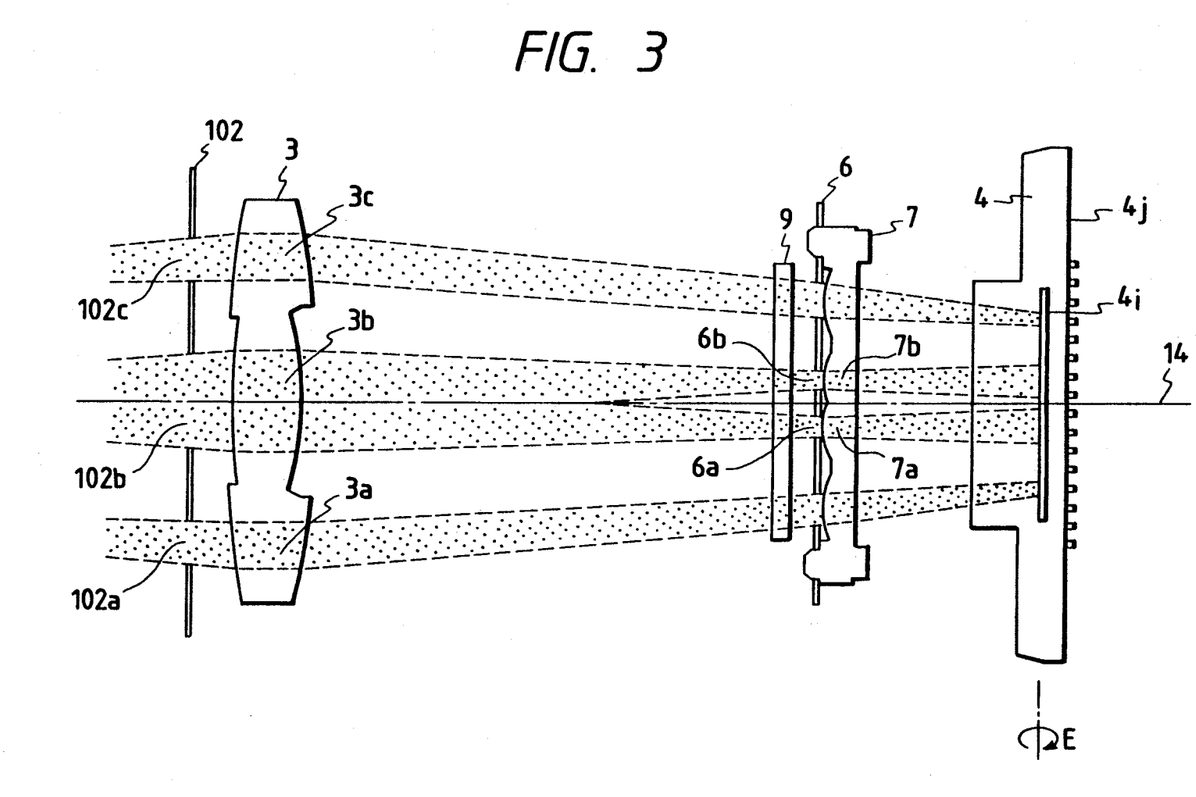
FIG. 3 is a cross sectional view showing the focus detection optic system.

FIG. 3 is a cross sectional view showing specifically the optics of the focus detection device shown in FIGS. 1 and 2. (As a plurality of lenses are used for re-imaging, each lens is shown with reference to its optical axis.) The structure of the optical system is explained here with reference to FIG. 3. The light flux on the optical axis first passes through the central part 3b of a split-field lens from the cross shaped opening located at the center of the field mask 102 which is symbolically depicted as the same part of field mask 2 in FIG. 1. It then passes through the infrared ray cutting filter 9, and enters pairs of openings, 6a/6b and 6c/6d, which are disposed perpendicular to each other on the aperture 6.

Two pairs of on-axial lenses of the re-imaging lens assembly 7 (7a/7b and 7c/7d) are located at position corresponding to the openings on the above-mentioned aperture 6 (6a/6b and 6c/6d) so that four secondary object images are formed on the sensor chips 4. The four pieces of secondary images on the sensor chip 4i are individually defined in a rectangle shape by the above-mentioned cross-shape of the field mask opening 102b. Assuming that the openings 6a to 6d of the aperture 6 are projected on the projection pupil of the objective lens 19 through the central part 3b of the split-field lens, the above-mentioned secondary images originate in separate light flux that come through different areas of the pupil of the objective lens. Accordingly, the interval between a pair of secondary images changes in accordance with the imaging state of the objective lens.

Concerning the light flux off the optical axis, two flux are seen in a symmetrical position as shown in FIG. 3. An explanation will be provided for one of them, which explanation will equally suffice for the other. With the initial entry to the openings of the field mask 102a, the light flux passes through the peripheral portion 3a of the split-field lens. It then goes through the infrared ray cutting filter 9 and the pair of openings 6e/6f, which are set at the circumference of the aperture 6. It is further guided to the pair of off-axial lenses 7e/7f of the re-imaging lens assembly 7, which face the pair of openings 6e/6f in an identical position, and finally forms the pair of secondary images on the sensor chip 4i. These secondary images form lines in a vertical direction to the paper surface and they are separated from each other, and defined in rectangular images by the field mask openings 102a. As the same in the case with the distance measuring areas on the optical axis, assuming that the openings 6e/6f of the aperture 6 are projected on the projection pupil of the objective lens 19 through the peripheral point 3a of the split field lens, a pair of secondary images originate in the light flux coming from different areas of the pupil of the objective lens.

Figure 4:
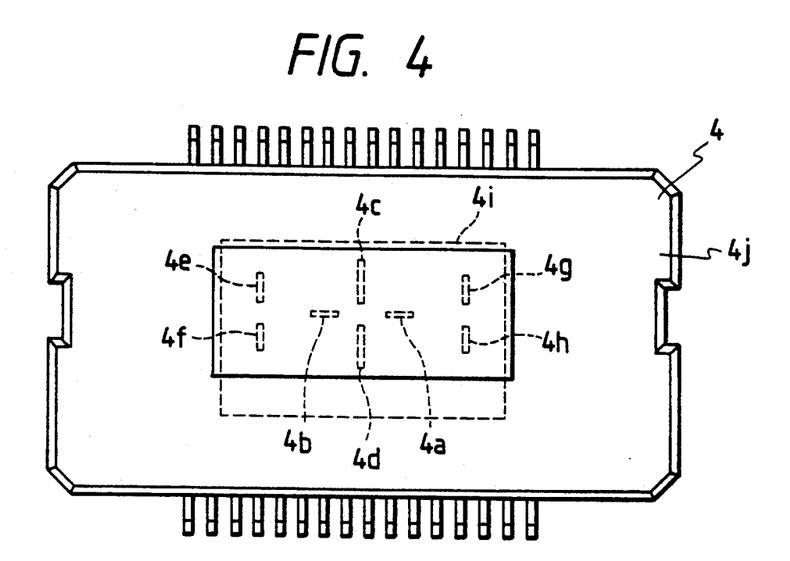
FIG. 4 is a top view showing a light receiving sensor device.
Figure 5:
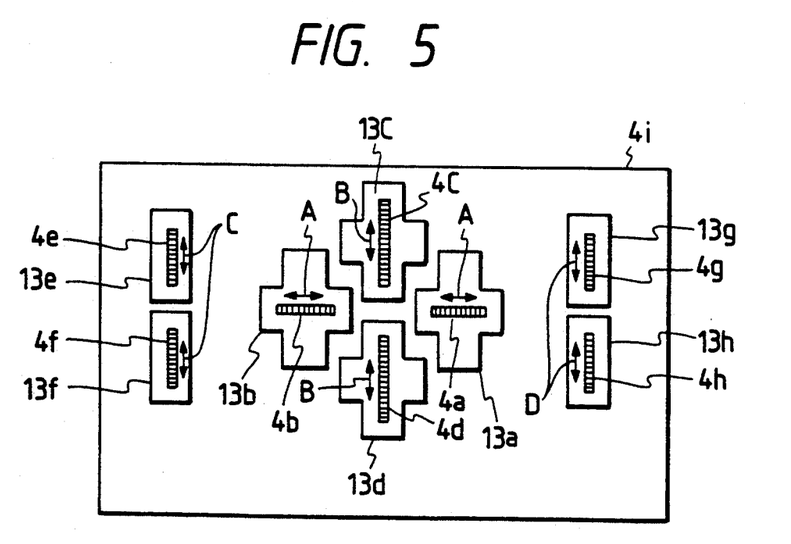
FIGS. 5 and 6 are drawings showing details of sensor chips.

Using the optic system described above, four pairs of secondary images totaling eight different images (including images both on and off the optical axis) are formed on the sensor chip 4i. FIGS. 4 and 5 show how those images look. FIG. 4 is a top view of the photo-sensor device 4 as seen from where the light comes in FIG. 5 shows in particular the sensor chips 4i.

In FIG. 4, 4j is a clear-mold package wherein the sensor chip 4i is contained. 4a to 4h are arrays of photo-sensors consisting of many picture elements. In FIG. 5, 13a to 13d are images of the field mask openings for on-axis distance measuring. 13e to 13h are images of the field mask openings for off axis distance measuring. Small letters a, b, . . . , h attached to the numbers match those of the aperture openings and re-imaging lenses. The secondary images are formed inside four pairs of images of the field mask openings. With the focus adjusting states of the objective lens 19 changing, the interval between secondary images changes in the dir B, C and D indicated by arrows. The thus obtained object images (secondary images) are received by photo-sensor arrays 4a to 4h, which convert these images to electrical signals. These signals are further processed using a known calculation method to detect the interval of the images. This enables an infocus position of an objective lens to be detected at each distance-measuring area.

In the workings of the focus detection device mentioned-above, its focusing accuracy is guaranteed only on a premise that a pair of photosensor arrays process the same part of secondary images for photo-electric conversion. Assuming that photo-sensor arrays are reversely projected to the object side, the proximity between a pair of secondary images deteriorates when the reversely projected image deviates in the direction perpendicular to photo-sensor arrays (except the case that an object has a uniform linearity along the direction where it is deviated). The deviation in this manner can cause erroneous detection of the image intervals, or even disable the distance-measuring function.

Figure 6:
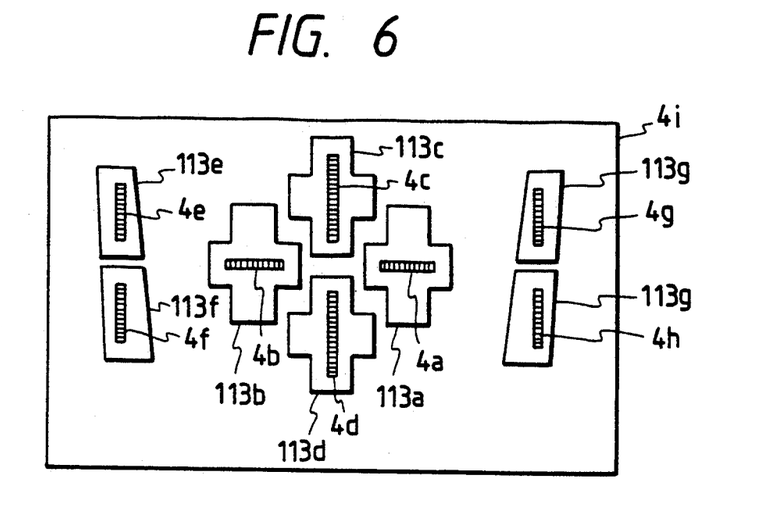
Figure 7:
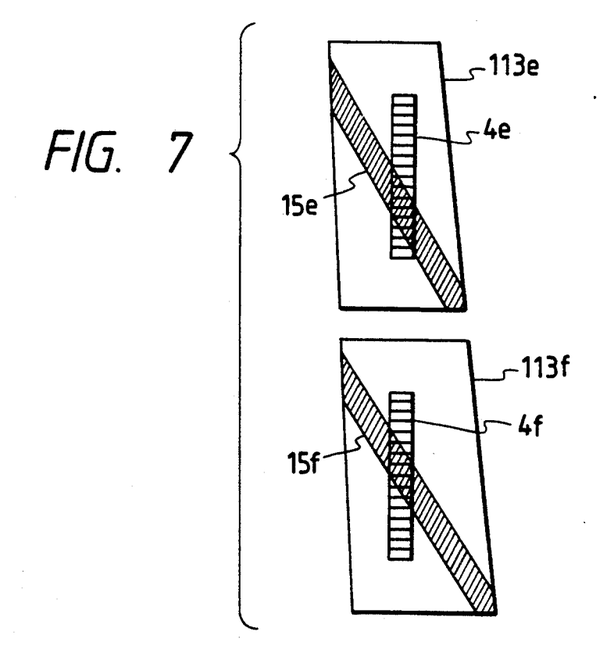
FIG. 7 is a drawing showing the relationship between arrays of photo-sensors and images of field-mask openings.

FIGS. 6 and 7 show how this detection error occurs. This particular case suggests that the photo-sensor devices 4 shown in FIG. 4 are positioned in wrong alignment with the optical axis 14, because the sensor chip 4i of the photo-sensor device 4 in FIG. 3 are obliquely fixed inside the clear-mold package 4h due to some production errors. Thus, the photo-sensor device is placed such that it tilts toward the direction E indicated by the arrow along the imaginary axis perpendicular to the plane including the photo-sensor arrays. Accordingly, the photo-sensor arrays 4f, 4d, 4h go away from the re-imaging lens 7, while, the photo-sensor arrays 4e, 4c and 4g go near the re-imaging lens. The resulting images of the field mask openings 113a to 113h are deformed as compared with the images shown in FIG. 5 on the photo-sensor arrays that are correctly aligned. Furthermore, where the light flux through the off axis distance-measuring areas is obliquely guided to the sensor chip 4i for reducing a usable area of the chip, the images of field mask openings 113f and 113h and the secondary object images tend to move inward from their predefined positions. On the other hand, the images of the field mask openings 113e, 113g and the secondary object images tend to move outward.

FIG. 7 is a drawing illustrating specifically the photo-sensor arrays 4e and 4f in detail, wherein the luminance distribution on an object is represented by the slanting lines. 15e and 15f are patterns on the object, and are originally to be projected at the same positions on the photo-sensor arrays 4e and 4f respectively. In this case, however, the image on 4e is projected at the lower part of the array and the image on 4f approximately at the center. This misalignment results in incorrect correspondence between the secondary image intervals and signals being output from the photoelectrical conversion process. Actual measuring operations based on such wrong information cause erroneous distance measuring.

An angle adjusting mechanism for the photo-sensor device, which constitutes one of the features of the present embodiment, is explained with reference to FIGS. 1 and 2. As described previously, the photo-sensor device 4 and the sensor holder 5 are mounted at the bottom of the main-body block 1. Two semi-circular cylinders are provided at both ends of the sensor holder, forming a rotational axis attached to the main-body block 1. In the middle of the sensor holder 5, there is a window 5c into which a projected part 4h of the clear-mold package fits toward the direction of a third mirror 8. The bottom surface of the sensor holder 5 is a packaging attaching surface to be contacted with the upper surface of the clear-mold package. At the bottom of the main-body block 1, bearing members 1a, 1b are disposed so as to support above-mentioned semi-circular cylinders 5a and 5b. The sensor holder 5 is movably fixed around the point F. Further, the size of the window 5c of the sensor holder 5 is arranged slightly larger than the thickened part 4h of the clear-mold package, thus allowing the photo-sensor device 4 to move in parallel to the sensor holder 5, or the rotate within the plane along the axis supported by the said semi-circular cylinders. It is possible to design the apparatus in the way that the positions of semi-circular cylinders and pillow blocks are differently set; that is, cylinders to be set on the main-body block and pillow blocks to be on the sensor holder, or vice versa.

In the mechanism as explained above, the photo-sensor positions can be adjusted by the following procedure:

1. Rough adjustment is first made by parallelly moving or rotating the photo-sensor device in such a manner that the eight photo-sensor arrays are aligned inside the eight images projected by the field mask openings.

2. Fine adjustment is then made by minute rotation of the photo-sensor device to align the photo-sensor arrays with the on-axis distance-measuring areas.
(The adjustment at this stage is shown in FIG. 6.)

3. The sensor holder 5 and the photo-sensor device 4 are slanted, thus aligning the images of the field mask openings with the photo-sensor arrays in the off-axis distance-measuring areas.
(The adjustment at this stage is shown in FIG. 5.)

4. Adhesives are hardened where the main-body block 1 is glued to the sensor holder 5, and the sensor holder 5 is glued to the clear-mold package 4j.

In the present embodiment of this invention, downsizing of the sensor chips is possible because a number of difficulties have been solved in that: a simple adjusting procedure can compensate both for erroneous settings of photo-sensors made during the production process, and for the oblique incidence of the off-axis light flux on the photo-sensors.

What is claimed is:

1. A focus detection device for use with a plurality of pairs of secondary imaging optics which generate, from an object image passed through an objective lens, light distributions the relative positions of which change in accordance with a focus adjusting state of the objective lens, a photo-sensor array of a light receiving means which receives the light distributions, and a signal forming means which forms a signal representing the focus adjusting state of the objective lens, said device comprising:

a pair of secondary imaging lenses included in said plurality of secondary imaging optics, a line connecting the optical axes of said pair of secondary imaging lenses being located off the optical axis between said objective lens and said photo-sensor array, said pair of secondary imaging lenses being arranged so that light flux therefrom is obliquely projected onto a predetermined light receiving surface of said light receiving means;

a first supporting means for supporting said pair of secondary imaging lenses; and a second supporting means tiltably mounted around an imaginary axis which is perpendicular to a plane including an array direction of the photo-sensor array for receiving the light flux, said second supporting means being fixed to said first supporting means and supporting the light receiving means.

2. A device according to claim 1, wherein said pair of secondary imaging lenses comprise two pairs of optics symmetrically arranged around the optical axis of the objective lens.

3. A device for adjusting the focus adjusting state of an objective lens, comprising:

a light receiving sensor device;

a lens assembly having a field lens located in the vicinity of a predetermined imaging plane of said objective lens, and a pair of secondary imaging lenses, a line connecting the optical axes of said pair of secondary imaging lenses being located off the optical axis between said objective lens and said light receiving sensor device;

a main-body block for supporting said lens assembly;

said light receiving sensor device having a plurality of photosensors for receiving light distributions formed by light fluxes projected from said pair of secondary imaging lenses, and for generating a signal representing a focus adjusting state of said objective lens in accordance with relative positions of said light distributions; and a holding means for adjustably supporting said light receiving sensor device to said main-body block and for fixing said light receiving sensor device to said main-body block, wherein said projected light flux is inclined toward the center portion of a light receiving surface of said light receiving sensor device.

* * * * *

UNITED STATES PATENT AND TRADEMARK OFFICE
CERTIFICATE OF CORRECTION

PATENT NO. : 5,258,804
DATED : November 2, 1993
INVENTOR(S) : YASUO SUDA

It is certified that error appears in the above-indentified patent and that said Letters Patent is hereby corrected as shown below:

On title page, item [30]
              "March. 13, 1990 [JP] Japan.....2-031726"
should read --February 13, 1990 [JP] Japan.....2-031726--.

Column 1:
    Line 17, "No. 4,902,810" should read --No. 4,902,810,--; and
    Line 52, "pass" should read --passes--.

Column 3:
    Line 2, "position" should read --positions--;
    Line 45, "in" should read --in.--;
    Line 58, "dir B," should read --directors A, B,--;
    Line 64, "infocus" should read -- in-focus--; and
    Line 68, "tioned-above," should read --tioned above,--.

Signed and Sealed this

Fifth Day of July, 1994

Attest:

BRUCE LEHMAN

Attesting Officer        Commissioner of Patents and Trademarks